Oct. 8, 1957

S. WEISSMAN 2,809,241

TWO-STAGE MAGNETIC AMPLIFIER

Filed July 12, 1955

2 Sheets-Sheet 1

INVENTOR.
Seymour Weissman
BY
Moses, Nolte + Nolte
ATTORNEYS

INVENTOR.
Seymour Weissman
BY
Moses, Nolte & Nolte
ATTORNEYS 2,809,241

TWO-STAGE MAGNETIC AMPLIFIER

Seymour Weissman, Brooklyn, N. Y., assignor to The W. L. Maxson Corporation, New York, N. Y., a corporation of New York Application July 12, 1955, Serial No. 521,606

11 Claims. (Cl. 179—171)

The present invention relates to a two-stage magnetic amplifier.

According to the present invention, a current operated first stage magnetic amplifier is combined with a voltage sensitive second stage magnetic amplifier to provide a circuit that combines fast response with the capability of operating from a high-impedance, low-voltage control source and this capability constitutes one of the objects of the present invention.

Another object of the invention is to provide a magnetic amplifier which does not require bias windings or a D. C. bias and so is free of one of the major sources of drift in magnetic amplifiers.

Another object of the invention is to provide a magnetic amplifier in which the input cores are saturated when no input current is supplied thereto, whereby the time constant of the input circuit is greatly reduced.

Another object of the invention is to provide a magnetic amplifier of the reset type which is stable in operation and which has a minimum dead space, that is, a minimum region of the amplifier characteristic in which an input signal produces no change in the output from the amplifier.

The invention will be more fully understood from the following description and the drawing in which.

Figure 1:
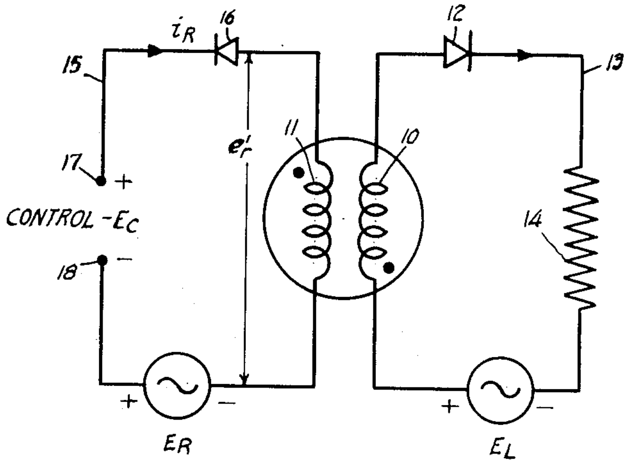
Figure 1 shows an elementary circuit of a magnetic amplifier of the preset or voltage-sensitive type.
Figure 2:
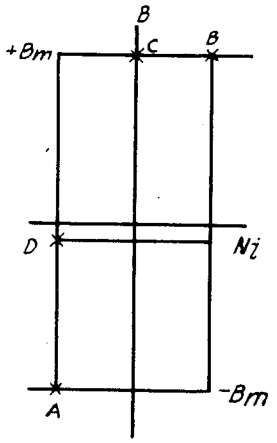
Figure 2 shows a hysteresis curve for the magnetic amplifier of Figure 1.

Figure 1 shows a one stage half-wave amplifier of the reset type. Perfect rectifiers and a rectangular hysteresis loop are assumed for the sake of simplicity. The output winding 10 on the magnetic core is called the gate winding 10 and the input winding 11 is called the reset winding 11. Output winding 10 is connected in a series circuit 13 comprising a rectifier 12, a load impedance 14 and an alternating supply voltage source $E_L$. Input winding 11 is connected in a series circuit 15 including a rectifier 16, a source of reset voltage $E_R$ and a control voltage $E_C$ adapted to be applied between terminals 17 and 18. Assume, at first, that no reset voltage $E_R$ is applied to the core and that the state of the core is at point A on the hysteresis loop (Figure 2). The winding 10 is designed to absorb the full supply voltage $E_L$ so that the state of the core will be at point B on the hysteresis loop at the end of the first positive half-cycle of voltage, $E_L$. During the negative half-cycle, the rectifier 12 in the output circuit 13 blocks current flow in the reverse direction so that the state of the core will be at point C at the end of the negative half-cycle. During the next positive half-cycle, the core will be completely saturated because the core was at the saturation level $+B_m$ at the start of the half cycle and can absorb no more voltage. The core will remain saturated from then on.

If the load resistance 14 is very small compared to the unsaturated impedance of the core and very large compared to the saturated impedance of the core, most of the supply voltage will appear across the core when it is unsaturated, and most of the supply voltage will appear across the load 14 when the core is saturated.

If the reset voltage, $E_R$ is applied to the circuit 15 on the control side of the core and the control terminals 17 and 18 are shorted, a negative integral of voltage will be applied to the core during the negative half-cycle. If $E_R/E_L = N_{11}/N_{10}$ where $N_{10}$ and $N_{11}$ are the number of turns of coils 10 and 11, and the resistances of the control circuit 15 and load circuit 13 are negligible, as much negative integral of voltage will be applied to the core during the negative half-cycle by the reset winding 11 as was applied to the core on the positive half-cycle by the gate winding 10. That is $$\frac{1}{N_{10}}\int_0^{\frac{\pi}{\omega}} E_{Lm} \sin \omega t dt = -\frac{1}{N_{11}}\int_{\frac{\pi}{\omega}}^{\frac{2\pi}{\omega}} E'_{Rm} \sin \omega t dt$$

where $E_{Lm}$ and $E'_{Rm}$ are the maximum values of $E_L$ and $E'_R$. The rectifier 16 in the control circuit 15 absorbs all of the voltage of the positive half-cycle of $E_R$, and no reset voltage will appear across winding 11 during the positive half-cycle. The state of the core will now be carried back to point A at the end of the negative half-cycle. The core will be unsaturated during the entire cycle, and only the core magnetizing current will flow in the load. If the voltage integral applied to the reset winding 11 is reduced in some manner, such as by applying a direct voltage to terminals 17—18 with the polarity shown, or by applying an alternating voltage to terminals 17—18 that is out of phase with $E_R$, the core will only be carried back to a point such as D on the hysteresis loop of Figure 2, during the negative half cycle. On the next positive half cycle the core cannot absorb the whole of the voltage integral applied to the winding 10 and will saturate during part of the half cycle, causing a current, $i_L$, to flow in the load 14, for part of the positive half cycle. The current that flows in the load, $i_L$, is inversely related to the voltage integral applied to the reset winding 11 during the negative half cycle. If the voltage integral applied to the reset winding 11 is reduced to zero, current will flow in the load 14 for the full positive half cycle.

The circuit of Fig. 1 has several advantages over the self-saturating current-sensitive type of magnetic amplifier. It has one cycle response, high input impedance, (theoretically infinite if perfect rectifiers are used), and no bias windings are required. The circuit has a basic disadvantage, however, in that the reset magnetizing current $i_R$ flows through the control source $E_c$ and therefore requires a low-impedance control source. This defect is overcome by the present invention.

Figure 3:
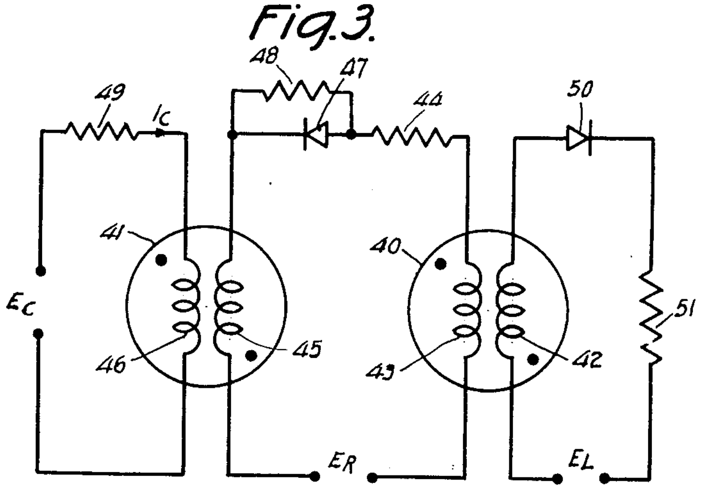
Figure 3 is a circuit diagram of a two stage magnetic amplifier.

Figure 3 shows a reset amplifier 40 controlled by a saturable core reactor or amplifier 41. The second stage is a reset amplifier of the type shown in Fig. 1. Output winding 42 is connected in series with a rectifier 50 and a load 51 to an A. C. source $E_L$. The reset winding 43 is connected in series with an alternating voltage source $E_R$, a resistor 44, output winding 45 of the first stage and rectifier 47. Rectifier 47 is preferably shunted by a resistor 48. The control winding 46 of the first stage is connected to a source of control voltage $E_C$ through a resistor 49 which varies the gain and the time constant of the first stage and is generally called a forcing resistor. The reset winding 43 of the second stage in series with the resistor 44 comprises the load for the first stage. The first stage core has a substantially rectangular hysteresis loop. With no current in control winding 46 the first stage core 41 will be saturated due to the rectifier 47 in its gate circuit. Thus the circuit of saturable core 41 behaves like a reset amplifier with no reset voltage. If the first stage core is saturated it can absorb very little voltage, and most of the interstage supply voltage, $E_R$, is available for the reset winding 43 of the second stage 40. The interstage supply voltage, $E_R$, is adjusted so that the second stage core 41 is reset fully with no control current in the first stage control winding 46. A control current, $I_c$, will cause the first stage core 41 to partially unsaturate, which reduces the voltage available to reset the second stage 40, causing it to saturate for a portion of the cycle. Thus the output of the second stage 40 is proportional to the control current. The series resistance 44 in the interstage circuit eliminates instability which is otherwise present.

Figure 4:
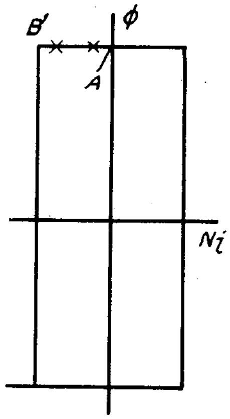
Figure 4 is a hysteresis curve applicable to the circuit of Figure 3.

If rectifier 47 has a high back-resistance, the first stage core will be reset to a point such as A′ on the hysteresis loop shown in Fig. 4 at the end of the non-conducting half-cycle of voltage $E_R$. Some control current will be required to move the state of the core to point B′ of the hysteresis curve before the core can start unsaturating. This would result in some dead space in the amplifier characteristic. By shunting rectifier 47 with a resistance, 48, it is possible to introduce enough leakage to reset the first stage core 41 to point B at the end of the non-conducting half-cycle. This eliminates most of the dead space.

Figures 5, 6:
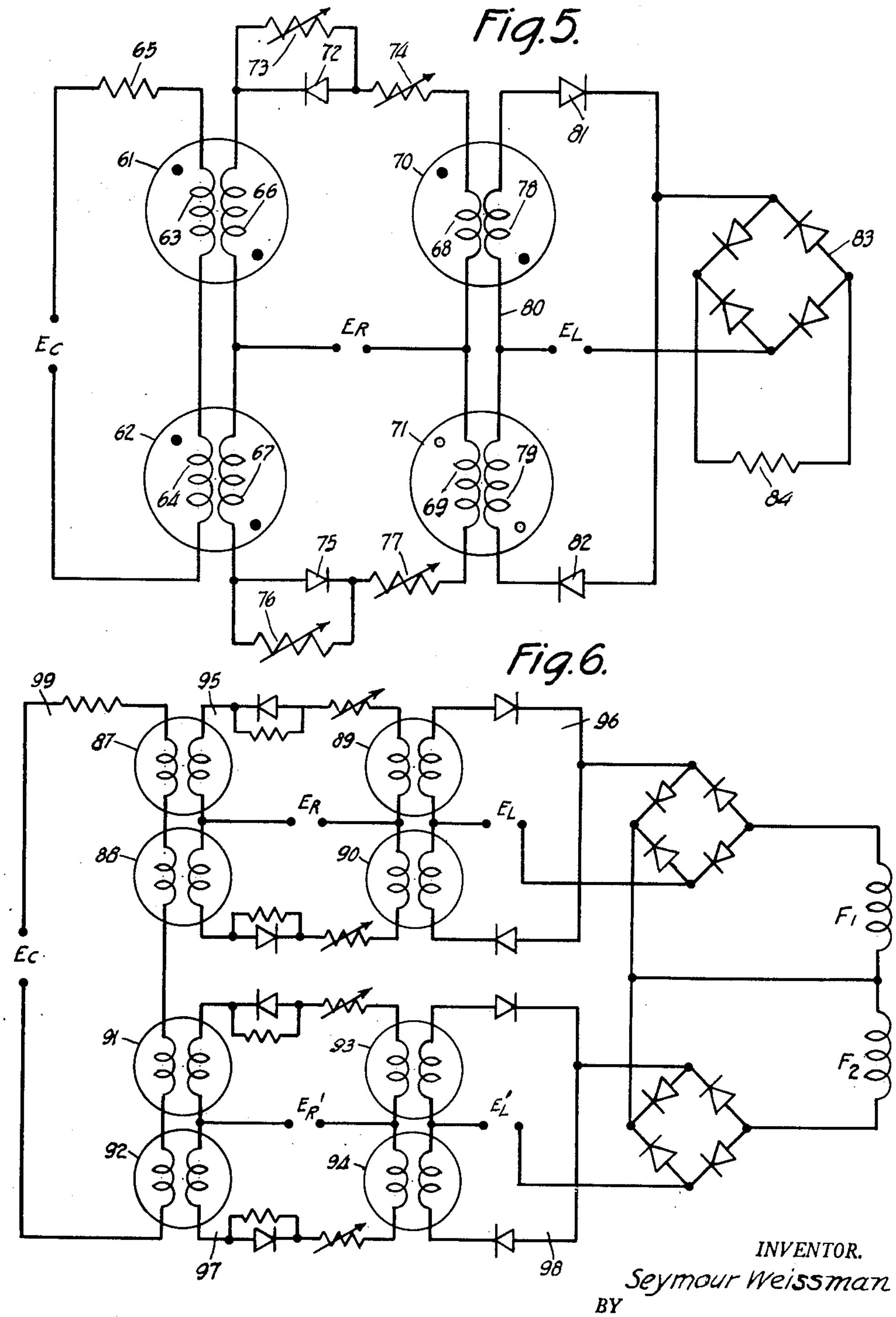
Figure 5 shows a full wave magnetic amplifier.
Figure 6 shows two full-wave magnetic amplifiers connected together for push-pull operation.

Figure 5 shows two half-wave amplifiers such as those disclosed in Figure 3 placed back-to-back to produce a full-wave amplifier. The first stage of the amplifier comprises saturable reactors 61 and 62 having their input windings 63 and 64 connected in series through a forcing impedance such as a small choke coil or a resistor 65 to the source of input or control voltage $E_c$. Saturable reactors 61 and 62 include output windings 66 and 67 each connected in series with the input windings 68 and 69 of reset magnetic amplifier cores 70 and 71 of the second stage. The coupling circuit connecting the output winding 66 to the reset winding 68 comprises a source of resetting alternating voltage $E_R$, a rectifier 72 and a resistor 73 in shunt therewith, and another resistor 74 in series therewith. The coupling circuit connecting the output winding 67 to the reset winding 69 is similar to the first mentioned coupling circuit and comprises the A. C. source $E_R$, the rectifier 75, the shunting resistor 76 and the series resistor 77. The output windings of magnetic amplifier cores 70 and 71 have one of their terminals connected together by a connection 80 and the other terminals interconnected through a pair of oppositely poled rectifiers 81 and 82. The common connection of rectifiers 81 and 82 is connected to the lead 80 through a bridge rectifier 83 and A. C. source $E_L$. A load resistor 84 is connected across the bridge rectifier. The use of rectifiers 81 and 82 together with the bridge rectifier 83 obviates the necessity for extremely low leakage rectifiers.

The operation of each half of the circuit of Fig. 5 is similar to that of Fig. 3. When no control voltage $E_c$ is applied, the cores of the reset amplifiers 70 and 71 of the second stage remain unsaturated throughout the entire cycle, while the cores of the first stage 61 and 62 remain saturated. During alternate half cycles, the source $E_R$ resets the magnetization of the core 70 to the point A of Fig. 2, while no current flows through the winding 69 because of the blocking effect of the rectifier 75. During that half cycle, current from the source $E_L$ through the winding 78 is blocked by the rectifier 81 but is permitted to flow through to the winding 79. Substantially, the entire voltage of $E_L$, however, is absorbed by the winding 79 since the core 71 is magnetized at the point A in Fig. 2. During the next half cycle, current from the source $E_R$ through the winding 68 is blocked by the rectifier 72, but is permitted to flow through the winding 69 by the rectifier 75. This resets the core of the amplifier 71 from the point C to the point A of Fig. 2. Current from the source $E_L$ into the winding 79 during that half cycle is blocked by the rectifier 82, and while current from the source $E_L$ can flow through the rectifier 81, substantially the entire voltage of $E_L$ is absorbed in the winding 78 in the process of moving the magnetization of the core of amplifier 70 to point B of the hysteresis curve of Fig. 2. When a control voltage $E_c$ is applied to the first stage, the saturable reactors 61 and 62 become unsaturated at least during a portion of each cycle. The output windings 66 and 67, therefore, absorb a portion of the voltage of the source $E_R$ and only a portion of the voltage integral of $E_R$ is applied to the control windings 68 and 69 of the second stage. This prevents the control windings 68 and 69 from resetting fully the cores 70 and 71 and, accordingly, permits current to flow through the output windings 78 and 79 during a portion of each cycle commensurate with the control voltage.

Since the rectifiers 72 and 75 have a negative temperature coefficient, it is desirable to make the temperature coefficient of the shunting resistors 73 and 76 positive in order to compensate, at least in part, for the negative temperature coefficient of the rectifiers. The rectifiers should have a high backward to forward resistance ratio and diffused junction germanium rectifiers have been found suitable. The shunting resistors 73 and 76 are adjusted to a value which gives a minimum dead space. Generally, these resistors are in the range of 20,000 to 100,000 ohms. The series resistors 74 and 77 may also be adjustable, having generally a value of 100 to 500 ohms. The series resistors are adjusted to give a balanced output from the amplifiers 70 and 71. The input windings 68 and 69 may have between 1/10 and 1/20 the number of turns of the output windings 78 and 79, while the output windings 66 and 67 of the first stage are preferably capable of absorbing from 3 to 10 times as much voltage as the input windings 68 and 69 of the second stage.

Fig. 6 shows two full-wave circuits or channels connected for push-pull operation in order to provide an output of reversible phase. One of the channels comprises the saturable core reactors 87 and 88 and the reset amplifier cores 89 and 90 while the other channel comprises the saturable core reactors 91 and 92 and the reset amplifier cores 93 and 94. Each channel is essentially similar to the circuits shown in Fig. 5. The upper channel is provided with an inter-stage coupling circuit 95 and an output circuit 96 while the lower channel includes a coupling circuit 97 and an output circuit 98. The output circuits 96 and 98 may be used to supply the field windings $F_1$ and $F_2$ of a reversible motor or any other desired load. The input windings of the saturable reactors 87, 88, 91 and 92 are connected in a series circuit 99 with the source of input or control voltage $E_c$ so that for one polarity of input signal the first stage of one of the channels is caused to unsaturate, while the first stage of the other channel is driven further into saturation. With an input signal of the opposite polarity, the operation of the two channels is reversed. The operation of each channel is the same as that of Fig. 5. It will be evident, therefore, from the explanations previously given, that the circuit of Fig. 6 will provide currents of opposite polarities to the two-field windings in the output circuits 96 and 98.

In Fig. 6, since all the input signal windings 87, 88, 91, and 92 are simultaneously saturated during some portion of each cycle, the inductance of the input circuit will be very low during this portion of the cycle. This condition permits the input signal current to build up rapidly, permitting the amplifier to respond rapidly to changes in input signal. This is in contrast to other types of full-wave push-pull current operated amplifiers using bias windings, in which the input signal windings are never saturated simultaneously.

Although certain specific embodiments have been shown and described many modifications and variations are possible without departing from the spirit of the present invention. Therefore, this invention is not to be limited except insofar as is necessary by the prior art and the scope of the appended claims.

I claim:

1. A magnetic amplifier comprising a first stage including a magnetic core having a substantially rectangular hysteresis curve, a first output winding and a first control winding on said core; a source of control voltage connected to the control winding; a second stage including a core having a substantially rectangular hysteresis curve and a second control winding and a second output winding on the core; a source of A. C. voltage, a first rectifier and a load connected in series with the second output winding; an interstage coupling circuit including a voltage source of the same frequency as the first source and a second rectifier connected in series with the first output winding and the second control winding; said rectifiers being poled to pass current during alternate half cycles of the alternating current, said cores and windings being dimensioned and arranged so that the first stage remains saturated and the second stage remains unsaturated throughout the entire A. C. cycle when no control voltage is applied, and means connected to the second stage for altering its magnetization so as to substantially eliminate a dead space in the amplifier characteristic in which the amplifier produces no appreciable output in response to a control voltage.

2. An amplifier according to claim 1 wherein said means is a resistor connected in shunt with the second rectifier.

3. An amplifier according to claim 2 wherein said resistor has a positive temperature coefficient and the second rectifier has a negative temperature coefficient, the temperature coefficients having relative values such that the impedance of the resistor and the second rectifier in parallel does not vary appreciably with the temperature.

4. An amplifier according to claim 1 including a resistor connected in series in said interstage coupling circuit.

5. A magnetic amplifier comprising a saturable reactor stage including a pair of cores each having an input winding and an output winding thereon, said cores having a substantially rectangular hysteresis curve, a source of control voltage connected in series with the pair of input windings; a full wave reset magnetic amplifier stage, including a pair of saturable cores and an output circuit comprising a pair of output windings, a first pair of oppositely poled rectifiers, a load and a first A. C. source connected in series; said amplifier stage having an input winding on each core, a pair of interstage coupling circuits including, in series, a rectifier, means for supplying alternating current, and one of the saturable reactor output windings and one of the amplifier stage input windings, the rectifiers in said coupling circuits being oppositely poled, and a resistor connected in series with each of said last mentioned rectifiers.

6. A magnetic amplifier according to claim 5 wherein said resistors are adjusted to balance the output of said amplifier stage output windings.

7. A magnetic amplifier according to claim 5 including means comprising a resistor in shunt with each of said last mentioned rectifiers for substantially eliminating dead space.

8. A magnetic amplifier according to claim 7, including a second saturable reactor stage connected in pushpull relation with the first mentioned saturable reactor stage; a second reset magnetic amplifier having an output circuit connected in pushpull relation with the output circuit of the first mentioned amplifier stage; and a second coupling circuit connecting the second saturable reactor to the second reset amplifier, said second coupling circuit including means for supplying alternating current of said frequency, a pair of oppositely poled rectifiers, a resistor in shunt with each rectifier and a resistor in series with each rectifier.

9. A magnetic amplifier according to claim 8, wherein said shunt connected resistors in the coupling circuits have a positive temperature coefficient.

10. A magnetic amplifier according to claim 5 wherein the amplifier output windings have one terminal of each connected to one terminal of the other and the other terminals of said output winding being connected together through the first pair of oppositely poled rectifiers, a full wave rectifier bridge circuit and the first A. C. source being connected in series between the junction of said first pair of rectifiers and the junction of said one terminals of the amplifier output windings, the load being connected across said bridge circuit.

11. A magnetic amplifier circuit comprising first and second pairs of reset magnetic amplifiers each having an input winding and an output winding, output circuit means connecting the output windings of each pair of magnetic amplifiers for full wave operation, first and second pairs of saturable core reactors each having an input winding and an output winding, pushpull circuit means connecting the output windings of the first and second pairs of saturable reactors to the input windings of the first and second pairs of magnetic amplifiers, respectively, said output circuit means and pushpull circuit means including an alternating current source, and input signal circuit means connected to the input windings of the first and second pairs of saturable reactors for simultaneously saturating all said saturable reactor input windings during a portion of the cycle of said alternating current, whereby the input signal current rises relatively rapidly during said portion of the cycle.

References Cited in the file of this patent

UNITED STATES PATENTS

| | | |
|---|---|---|
| 2,126,790 | Logan | Aug. 16, 1938 |
| 2,509,738 | Lord | May 30, 1950 |
| 2,509,864 | Hedstrom | May 30, 1950 |
| 2,636,150 | McKenney | Apr. 21, 1953 |
| 2,688,724 | Newell | Sept. 7, 1954 |